United States Patent

Nakai

[19]

[11] Patent Number: 5,859,750
[45] Date of Patent: Jan. 12, 1999

[54] MAGNETIC RECORDING-AND-REPRODUCING APPARATUS

[75] Inventor: Takashi Nakai, Fukushima-ken, Japan

[73] Assignee: Alps Electric Co., Ltd., Tokyo, Japan

[21] Appl. No.: 844,716

[22] Filed: Apr. 18, 1997

[30] Foreign Application Priority Data

Oct. 5, 1996 [JP] Japan ..................................... 8-116503

[51] Int. Cl.⁶ ............................ G11B 21/12; G11B 21/22
[52] U.S. Cl. ....................................... 360/105; 360/99.12
[58] Field of Search ..................................... 360/105, 109

[56] References Cited

U.S. PATENT DOCUMENTS

| | | | |
|---|---|---|---|
| 4,870,518 | 9/1989 | Thompson et al. | 360/99.12 |
| 5,060,101 | 10/1991 | Isomura | 360/105 X |
| 5,196,975 | 3/1993 | Inoue | 360/105 |
| 5,438,465 | 8/1995 | Noda | 360/75 |

Primary Examiner—John H. Wolff
Attorney, Agent, or Firm—Brinks Hofer Gilson & Lione

[57] ABSTRACT

A lower magnetic head is attached to a carriage and a head support member supporting an upper magnetic head is hinged to the carriage. The head support member is provided on its lower surface in a continuous arrangement with a first flat portion, an inclined portion and a second flat portion. A cartridge holder for holding a disk cartridge, and a cross plate are fixed to an open upper end of a main chassis. A driving pin is fixed to the cross plate. When the carriage is moved away from a magnetic disk with an auxiliary chassis held at an upper loading position, the driving pin comes into contact wit the second flat portion of the head support member to separate the upper magnetic head from the magnetic disk. When the carriage moves toward the center of the magnetic disk, the driving pin is disengaged from the head support member, so that the upper magnetic head is pressed through the magnetic disk against the lower magnetic disk.

8 Claims, 5 Drawing Sheets

MAGNETIC RECORDING-AND-REPRODUCING APPARATUS

BACKGROUND OF THE INVENTION

The present invention relates to a magnetic recording-and-reproducing apparatus provided with a magnetic head to record information on and to reproduce information from a magnetic disk and, more specifically, a lifting mechanism included in a magnetic recording-and-reproducing apparatus to move a magnetic head relative to a magnetic disk.

A magnetic recording-and-reproducing apparatus designed to record information on and reproducing information from a magnetic disk contained in a disk cartridge is provided with a head moving mechanism which is driven for reciprocating movement by a motor. When recording information on or reproducing information from a magnetic disk, the head moving mechanism holding a pair of magnetic heads respectively on the opposite sides of a magnetic disk moves in directions along the radius of the magnetic disk.

A known head lifting mechanism employed in such a conventional magnetic recording-and-reproducing apparatus has a slide plate supported for forward and backward movements on a chassis, and a cartridge holder supported for vertical movement on the chassis, and the cartridge holder is moved vertically to move an upper magnetic head vertically. In this magnetic head lifting mechanism, the cartridge holder is held at an upper unloading position by the slide plate, and the upper magnetic head is at an upper position and in contact with the upper surface of the cartridge holder of the head moving mechanism when the cartridge holder is not loaded with any disk cartridge. When a disk cartridge is loaded into the cartridge holder, a disk cartridge loading action moves the slide plate forward, and the cartridge holder moves down along a cam groove formed in the slide plate to a loading position. Consequently, the disk cartridge held on the cartridge holder, and the upper magnetic head in contact with the upper surface of the cartridge holder move down, so that the magnetic disk is positioned between the upper and the lower magnetic head. In this state, the magnetic disk is rotated and the head moving mechanism is reciprocated along the radius of the magnetic disk to record information on or to reproduce information from the magnetic disk.

In operating the conventional magnetic recording-and-reproducing apparatus, the cartridge holder needs to be lowered together with the disk cartridge toward the lower magnetic head after inserting the disk cartridge through a slot formed in the front wall of the magnetic recording-and-reproducing apparatus into the cartridge holder. Therefore, the disk cartridge must completely be inserted through the slot into the cartridge holder in order to move the disk cartridge vertically. Such an arrangement is an obstacle to the reduction of the depth of the magnetic recording-and-reproducing apparatus. Since the upper magnetic head collides violently through the magnetic disk against the lower magnetic head when the disk cartridge is lowered, the magnetic heads are liable to be damaged.

The applicant of the present patent application made efforts to make a magnetic recording-and-reproducing apparatus fit for practical use. This magnetic recording-and-reproducing apparatus has a cartridge holder fixed to a chassis, an auxiliary chassis supported for forward, backward and vertical movements, and a head moving mechanism mounted on the auxiliary chassis so as to be moved vertically relative to a disk cartridge. Although this magnetic recording-and-reproducing apparatus solves the foregoing problems in the conventional magnetic recording-and-reproducing apparatus, the upper magnetic head included in the head moving mechanism cannot vertically be moved by the cartridge holder, because the cartridge holder holding the disk cartridge is fixed to the chassis, and needs another lifting mechanism for vertically moving the magnetic head. It is a problem to form such a lifting mechanism in a simple construction.

SUMMARY OF THE INVENTION

The present invention has been made in view of the foregoing problems and it is therefore an object of the present invention to provide a magnetic recording-and-reproducing apparatus provided with lifting mechanism for vertically moving the magnetic head in a simple construction.

According to an aspect of the present invention, there is provided a magnetic recording-and-reproducing apparatus comprising a main chassis, an auxiliary chassis supported for forward, backward and vertical movements on the main chassis, and a head moving mechanism mounted on the auxiliary chassis, wherein the head moving mechanism is provided with a head support member having an inclined portion, and the main chassis is provided with a driving member capable of engaging with the inclined portion of the head support member. When a carriage reciprocates along the radius of a magnetic disk with the auxiliary chassis held at an elevated position, the mode of engagement of the inclined portion and the driving member changes and the head support member holding a magnetic head moves smoothly vertically relative to the magnetic disk. Since the head support member is held in contact with the driving member at the elevated position even if the head moving mechanism is lowered together with the auxiliary chassis, the disk cartridge does not collides against the magnetic head when the same is ejected and the magnetic head is not damaged.

BRIEF DESCRIPTION OF THE DRAWINGS

The above and other objects, features and advantages of the present invention will become apparent from the following description taken in connection with the accompanying drawings, in which.

DESCRIPTION OF THE PREFERRED EMBODIMENT

Figure 1:
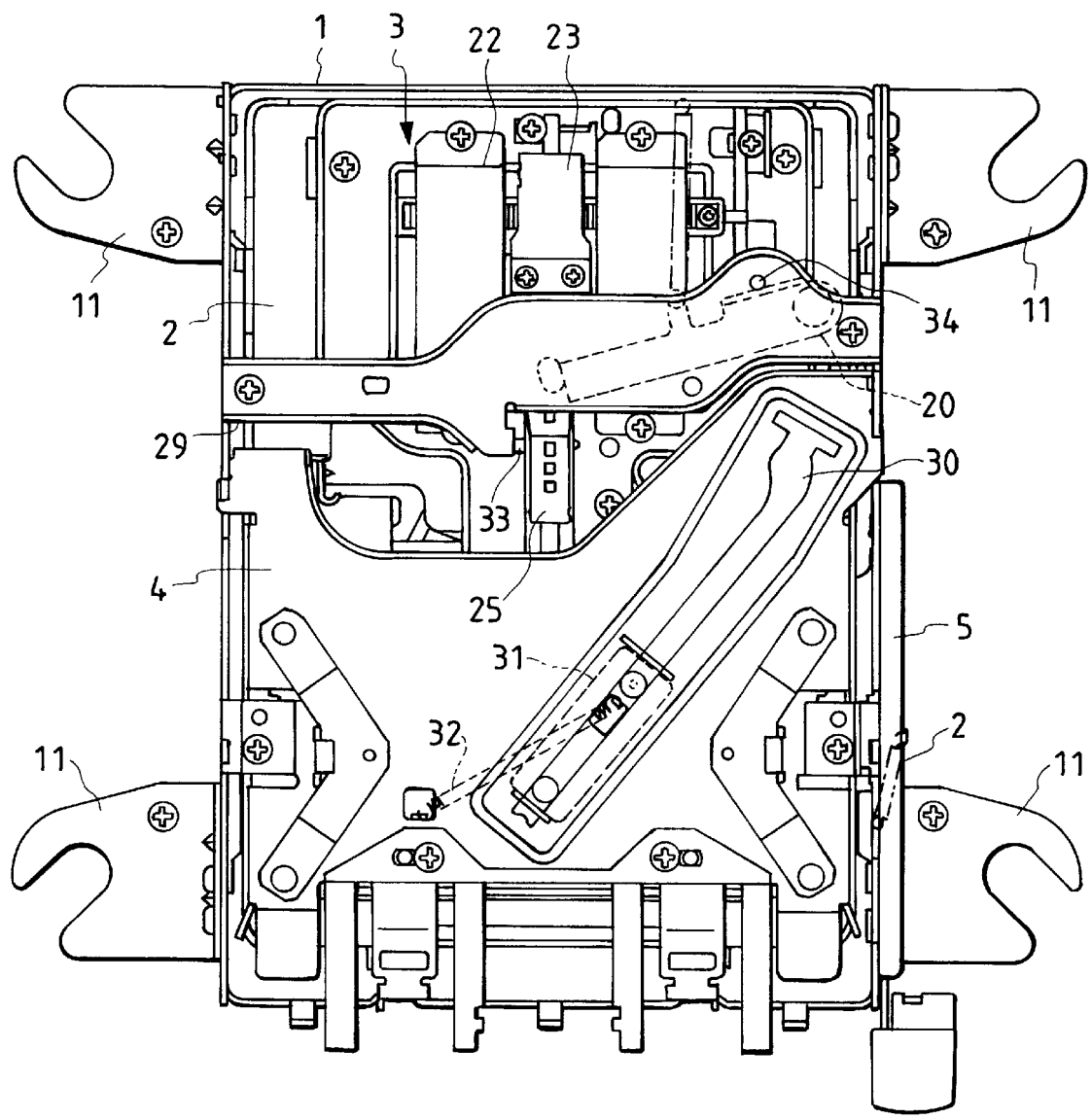
FIG. 1 is a plan view of a magnetic recording-and-reproducing apparatus in a preferred embodiment according to the present invention.
Figure 2:
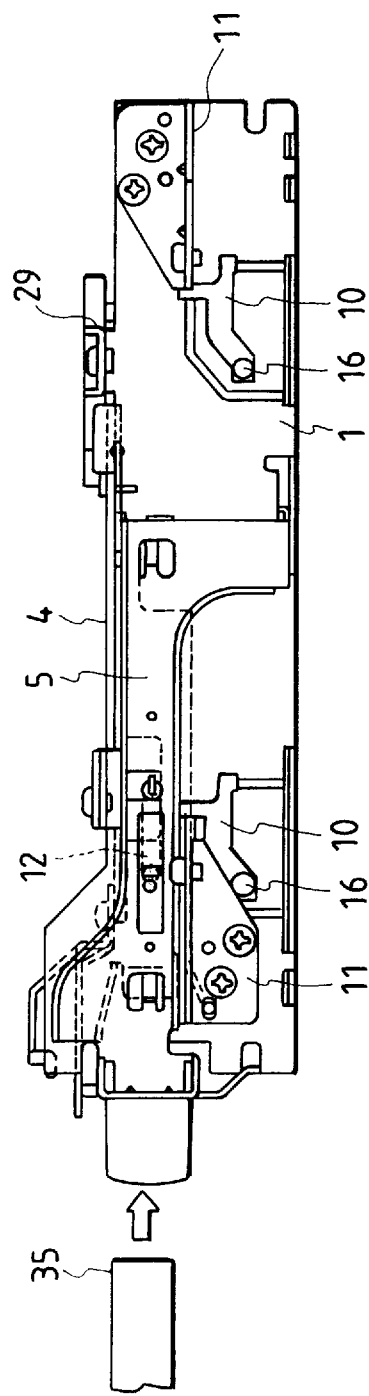
FIG. 2 is a side view of the magnetic recording-and-reproducing apparatus of FIG. 1.

Referring to FIGS. 1 and 2, a magnetic recording-and-reproducing apparatus in a preferred embodiment according to the present invention has a main chassis 1, formed by bending a metal plate, an auxiliary chassis 2 supported for forward, backward and vertical movements on the main chassis 1, a head moving mechanism 3 mounted on the auxiliary chassis 2, a cartridge holder 4 fixed to an open upper end of the main chassis 1, and an ejecting lever 5 supported on a side wall of the main chassis 1.

Figure 3:
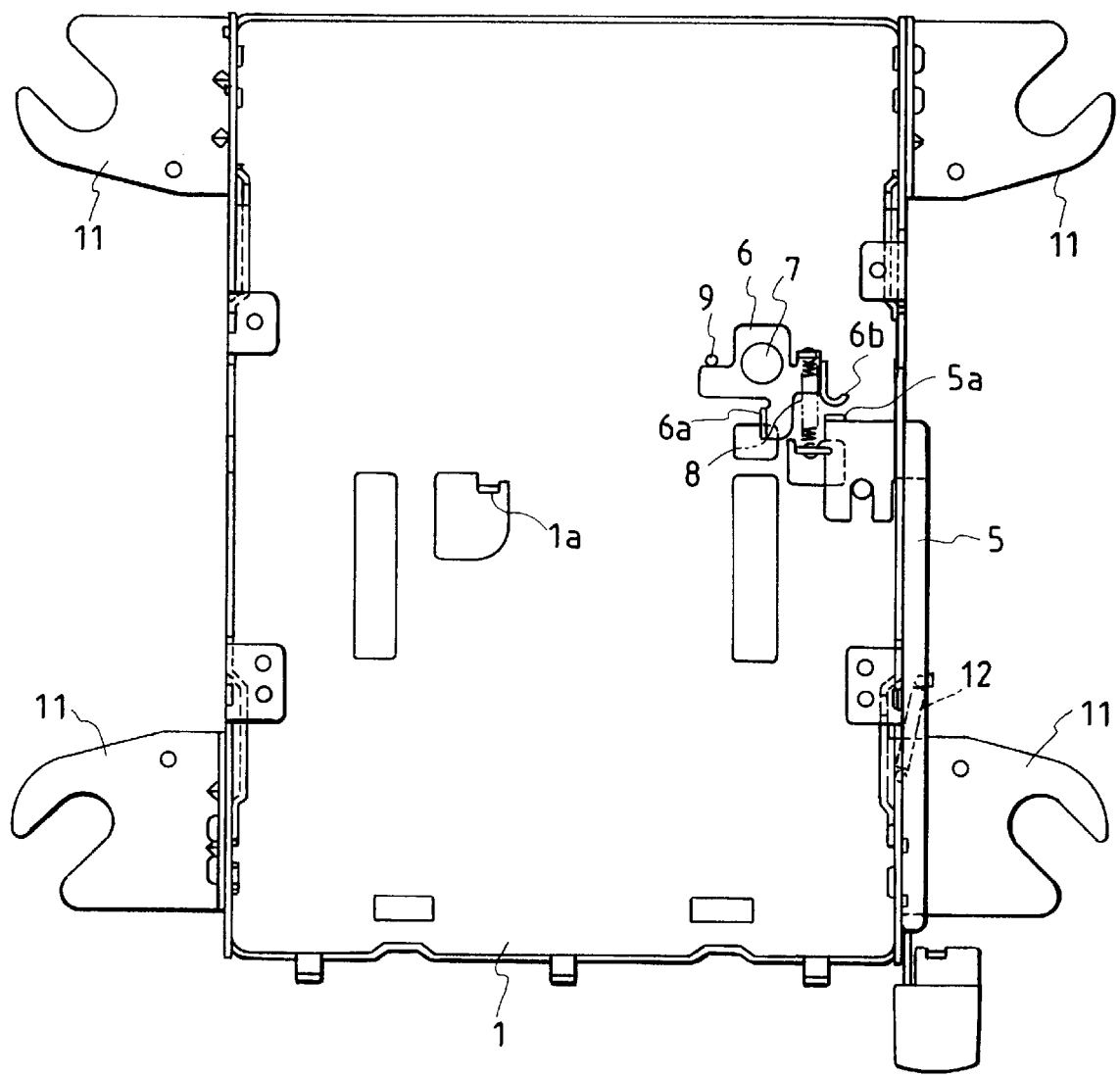
FIG. 3 is a plan view of a main chassis included in the magnetic recording-and-reproducing apparatus of FIG. 1.

As shown in FIG. 3, a portion of the bottom wall of the main chassis 1 is raised to form a stopper 1a, and a first locking lever 6 is supported pivotally by a shaft 7 on the bottom wall of the main chassis 1. The first locking lever 6 has a locking lug 6a and a receiving lug 6b. The first locking lever 6 is biased clockwise, as viewed in FIG. 3, by a spring 8 and the clockwise turning of the first locking lever 6 is limited by a projection 9 formed on the main chassis 1. Two cam slots 10 are formed in each of the opposite side walls of the main chassis 1 as shown in FIG. 2, and hence the main chassis 1 is provided with four cam slots 10. Four mounting plates 11 formed by bending plates and having an L-shaped cross section are attached to the outer surfaces of the opposite side walls of the main chassis 1. The main chassis 1 is placed in a casing and the mounting plates 11 are fastened directly to the casing or fastened indirectly to the casing with rubber cushioning members interposed between the mounting plates 11 and the casing. The ejecting lever 5 is supported for forward and backward movement on one of the side walls of the main chassis 1, the ejecting lever 5 is biased downward, as viewed in FIG. 3, by a spring 12, and a releasing part 5a formed in one end of the ejecting lever 5 is positioned opposite to the receiving lug 6b of the first locking lever 6.

Figure 4:
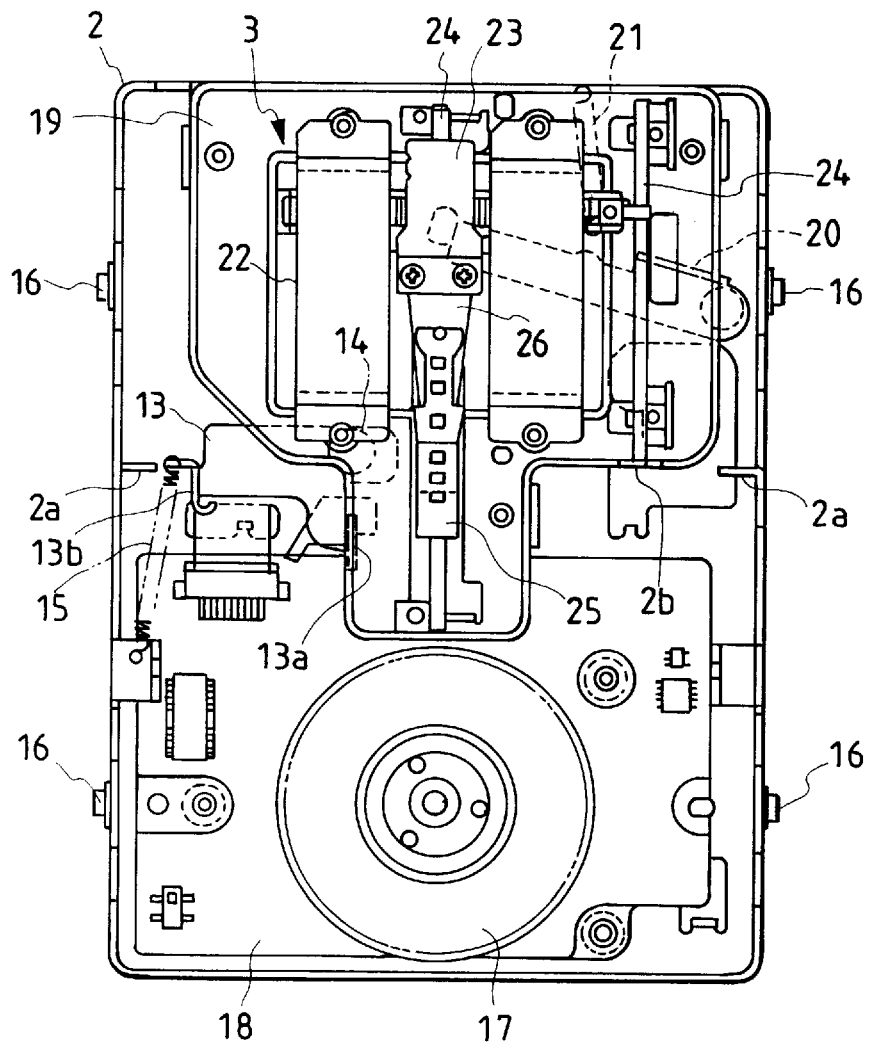
FIG. 4 is a plan view of an auxiliary chassis included in the magnetic recording-and-reproducing apparatus of FIG. 1.

As shown in FIG. 4, the auxiliary chassis 2 is placed in the main chassis 1, and a second locking lever 13 is supported for turning by a shaft 14 on the auxiliary chassis 2. The second locking lever 13 is biased counterclockwise, as viewed in FIG. 4, by a spring 15. The second locking lever 13 has a locking lug 13a capable of being brought into engagement with the stopper 1a of the main chassis 1a, and a receiving lug 13b capable of being brought into contact with a disk cartridge. Two guide projections 16 are formed in each of the opposite side walls of the auxiliary chassis 2, and hence the auxiliary chassis 2 is provided with four guide projections 16. The guide projections 16 are inserted in the cam slots 10 of the main chassis 1, respectively. The auxiliary chassis 2 is biased downward, as viewed in FIG. 1, by a spring, not shown. The auxiliary chassis 2 is provided at the middles of the opposite side walls thereof with a pair of receiving projections 2a formed by raising portions of the side walls and capable of being brought into contact with a disk cartridge, and a stopping lug 2b formed by raising a portion of the bottom wall thereof and capable of engaging with the locking lug 6a of the locking lever 6. Fixed to the auxiliary chassis 2 are a wiring board 18 mounted with a spindle motor 17 and circuit elements for driving the spindle motor 17, and a support plate 19 supporting the head moving mechanism 3. A driving arm 20 is supported for turning on the auxiliary chassis 2. The driving arm 20 lies between the auxiliary chassis 2 and the support plate 19 and is biased clockwise, as viewed in FIG. 4, by a spring 21.

Figure 5:
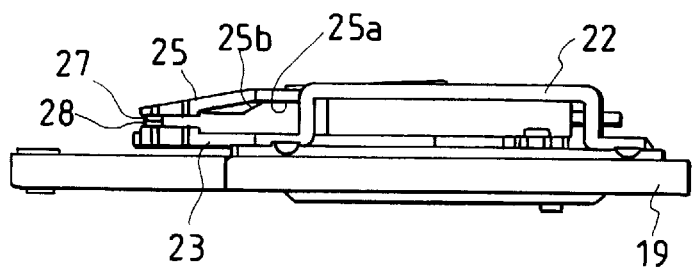
FIG. 5 is a side view of a head moving mechanism included in the magnetic recording-and-reproducing apparatus of FIG. 1; and FIGS., 6A, 6B and 6C are views of assistance in explaining the operation of the head moving mechanism of FIG. 5.

The head moving mechanism 3 comprises a linear motor 22, and a carriage 23 driven for movement by the linear motor 22. The carriage 23 can be reciprocated vertically, as viewed in FIG. 4, along a pair of guide shafts 24 and is biased upward, as viewed in FIG. 4, by the driving arm 20. As shown in FIG. 5, a plate spring 37 connected to a head support member 25 is hinged to the carriage 23, and the head support member 25 is biased toward the carriage 23 by a loading spring 26. The lower surface of the head support member 25 has, in a continuous arrangement from the rear end toward the front end, a first flat portion 25a, an inclined portion 25b and a second flat portion 25c. An upper magnetic head 27 is attached to the front end of the lower surface of the head support member 25. A lower magnetic head 28 is attached to the upper surface of the carriage 23 opposite to the upper magnetic head 27.

Figure 6A:
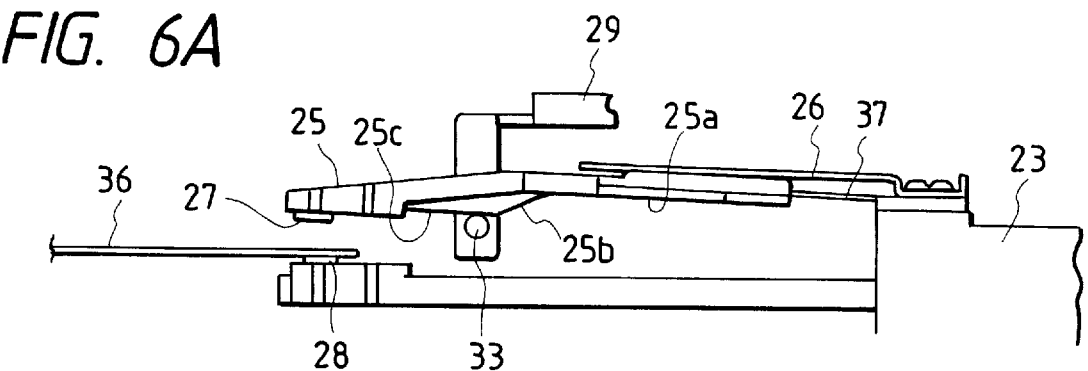
Figure 6B:
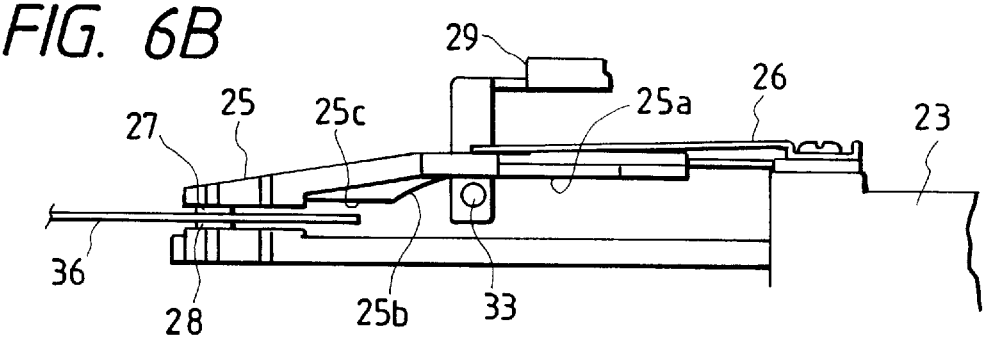

Referring again to FIG. 1, the cartridge holder 4 and a cross plate 29 are fixed to the open upper end of the main chassis 1. The cartridge holder 4 is provided with a guide slot 30 in its upper wall. A shutter operating member 31 is in sliding engagement with the guide slot 30 and is biased toward the starting end of the guide slot 30 by a spring 32. A driving pin 33 and a control pin 34 are fixed to the cross plate 29. The control pin 34 projects downward to limit the turning of the driving arm 20. The driving pin 33 extends horizontally under and across the head support member 25. When the auxiliary chassis 2 is at an upper loading position, the upper magnetic head 27 is separated from the lower magnetic head 28 if the driving pin 33 is in contact with the second flat portion 25c of the head support member 25 as shown in FIG. 6A, and the upper magnetic head 27 is biased toward the lower magnetic head 28 by the loading spring 26 if the driving pin 33 is on the side of the first flat portion 25a of the head support member 25 as shown in FIG. 6B. When the auxiliary chassis 2 is at a lower unloading position, the driving pin 33 is in contact with the first flat portion 25a of the head support member 25 and the upper magnetic head 27 and the lower magnetic head 28 are separated from each other by a maximum distance.

Figure 6C:
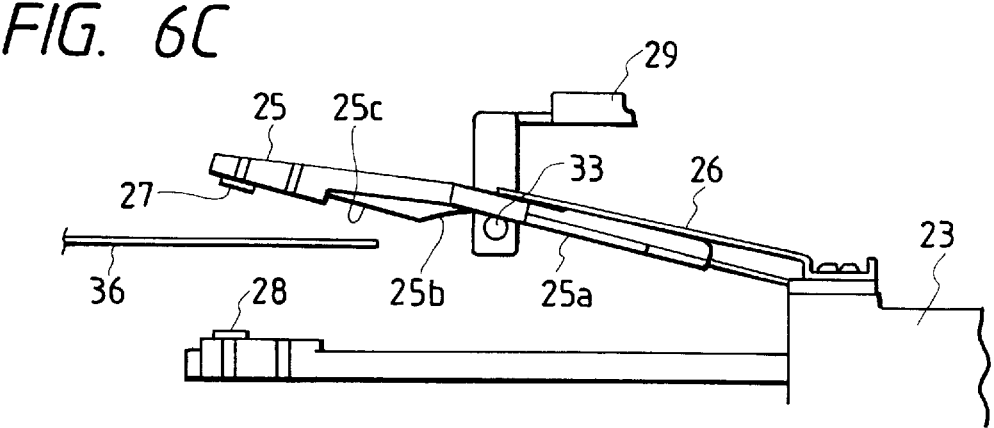

When the magnetic recording-and-reproducing apparatus is not loaded with a disk cartridge 35, the auxiliary chassis 2 is biased at the unloading position at a lower rear end by a spring not shown, and the locking lug 13a of the second locking lever 13 is in engagement with the stopper 1a of the main chassis 1 to lock the auxiliary chassis 2. In this state, the driving arm 20 biases the carriage 23 upward, as viewed in FIG. 4, in order that the carriage may not be moved by external vibrations. As shown in FIG. 6C, the driving pin 33 is in contact with the first flat portion 25a of the head support member 25 to separate the upper magnetic head 27 and the lower magnetic head 28 from each other by the maximum distance.

Referring to FIG. 2, when the disk cartridge 35 is inserted through a slot, not shown, formed in the front wall of the magnetic recording-and-reproducing apparatus into the cartridge holder 4, the front surface of the disk cartridge 35 comes into contact with and pushes the receiving lug 13b as the disk cartridge 35 is pushed into the cartridge holder 4. Consequently, the second locking lever 13 is turned clockwise about the shaft 14 to release the auxiliary chassis 2. As the disk cartridge 35 is inserted further into the cartridge holder 4, the shutter operating member 31 moving in the guide slot opens the shutter, not shown, of the disk cartridge 35, the front surface of the disk cartridge comes into contact with and pushes the receiving projections 2a, the guide projections 16 move along the cam slots 10, and hence the auxiliary chassis 2 moves forward and upward on the main chassis 1 to the loading position. Consequently, the first locking lever 6 is turned clockwise on the shaft 7 and the locking lug 6a comes into engagement with the stopper 2b to lock the auxiliary chassis 2 at the loading position. As the auxiliary chassis 2 moves forward relative to the main chassis 1, the control pin 34 fixed to the main chassis 1 limits the turning of the driving arm 20, whereby the carriage 23 is released from the biasing force of the driving arm 20.

After the disk cartridge 35 has completely been inserted into the cartridge holder 4, the cartridge holder 4 holds the disk cartridge at an elevated position. The spindle motor 17 is raised together with the auxiliary chassis 2 and engages with the center hub, not shown, of a magnetic disk 36 contained in the disk cartridge 35. The spindle motor 17 is actuated to drive the magnetic disk 36 for rotation, the linear motor 22 drives the head moving mechanism 3 for movement in directions according to the direction and intensity of a current supplied to the coil thereof to reciprocate the carriage 23 radially of the magnetic disk 36 along the pair of guide shafts 24. The position of the driving pin 33 fixed to the cross plate 29 relative to the lower surface of the head support member 25 varies as the carriage 23 is reciprocated. When the carriage 23 is at are tracted position away from the magnetic disk 36, the driving pin 33 is in contact with the second flat portion 25c of the head support member 25 to hold the upper magnetic head 27 apart from the magnetic disk 36 as shown in FIG. 6A. When the carriage 23 is moved toward the center of the magnetic disk 36, the driving pin 33 is separated from the head support member 25 as shown in FIG. 6B, the upper magnetic head 27 is pressed through the magnetic disk 36 against the lower magnetic head 28 by the loading spring 26, and the upper magnetic head 27 and the lower magnetic head 28 record information on or reproduce information from the magnetic disk 36. During those operations, the magnetic disk 36 is always in contact with the lower magnetic head 28. However, the magnetic disk 36 is scarcely abraded even if the magnetic disk 36 is rotated continuously by the spindle motor 17, because the magnetic disk 36 is in contact with the lower magnetic head 28 at a low contact pressure in the state shown in FIG. 6A. Accordingly, the magnetic disk 36 may be rotated continuously at the loading position to reduce access time.

When ejecting the disk cartridge 35 from the magnetic recording-and-reproducing apparatus by pushing the ejecting lever 5 against the resilience of the spring 12, the releasing part 5a of the ejecting lever pushes the first locking lever 6 at the receiving lug 6b to turn the first locking lever 6 counterclockwise. Consequently, the locking lug 6a and the stopper 2b are disengaged, the auxiliary chassis 2 moves backward and downward on the main chassis 1, and the auxiliary chassis 2 is locked again at the unloading position by the second locking lever 13. During this movement of the auxiliary chassis 2, the head moving mechanism 3 is lowered together with the auxiliary chassis 2. However, the driving pin 33 comes into contact with the first flat portion 25a of the head support member 25 to separate the upper magnetic head 27 and the lower magnetic head 28 great distances apart from the magnetic disk 36 as shown in FIG. 6C, because the downward movement of the head support member 25 is limited by the driving pin 33. Therefore, both the magnetic heads 27 and 28 stay clear of the path of the disk cartridge 35 and the collision of the disk cartridge 35 with the magnetic heads 27 and 28 can be prevented.

Although the invention has been described in its preferred form with a certain degree of particularity, obviously, many changes and variations are possible therein. It is therefore to be understood that the present invention may be practiced otherwise than as specifically described herein without departing from the scope and spirit thereof.

What is claimed is:

1. A magnetic recording-and-reproducing apparatus comprising: a main chassis; an auxiliary chassis having a head moving mechanism including magnetic heads for recording information on and reproducing information from a magnetic disk; a cam mechanism which positions the auxiliary chassis at a raised load position under a forward movement of the auxiliary chassis on the main chassis and which positions the auxiliary chassis at a lowered unload position under a rearward movement of the auxiliary chassis on the main chassis; and a cartridge holder fixed to the main chassis to hold a disk cartridge containing a magnetic disk;

wherein the head moving mechanism comprises a carriage supporting one of the magnetic heads and capable of being reciprocated radially of the magnetic disk, and a head support member hinged to the carriage, supporting the other magnetic head, and having an inclined portion; and the main chassis is provided with a driving member capable of engaging with the inclined portion of the head support member.

2. A magnetic recording-and-reproducing apparatus according to claim 1, wherein the head support member has first and second flat portions on the opposite sides of the inclined portions, respectively.

3. A magnetic recording-and-reproducing apparatus according to claim 1, wherein the inclined portion is formed in an upper or a lower surface of the head support member.

4. A magnetic recording-and-reproducing apparatus according to claim 1, wherein the driving member is a pin.

5. A magnetic recording-and-reproducing apparatus according to claim 1, wherein a lower magnetic head is attached to the carriage, and an upper magnetic head is attached to the head support member.

6. A magnetic recording-and-reproducing apparatus comprising a head moving mechanism including magnetic heads for recording information on and reproducing information from a magnetic disk;

the head moving mechanism having a carriage supported by a chassis and reciprocatable in a diametrical direction of said magnetic disk, wherein one of the magnetic heads is held by said carriage;

a head support member hinged to said carriage and holding the other magnetic head wherein said head support member has an inclined portion:

a driving member which can be engaged in sliding contact with said inclined portion, said drive member being supported at said chassis;

wherein when said carriage is placed at a retracted position where it is moved away from said magnetic disk, said driving member is positioned closer to said magnetic disk than said inclined portion and causes the other magnetic head to be spaced apart from one of the other magnetic heads; and wherein when said carriage is moved toward the center of said magnetic disk, said driving member is positioned at a location farther from said magnetic disk than said inclined portion through its sliding contact with said inclined portion and causes the other magnetic head to be moved toward one of the other magnetic heads.

7. A magnetic recording-and-reproducing apparatus according to claim 6, wherein the head support member has first and second flat portions on the opposite sides of the inclined portions, respectively.

8. A magnetic recording-and-reproducing apparatus according to claim 6, wherein the inclined portion is formed in an upper or a lower surface of the head support member.

* * * * *